US008924959B2

(12) United States Patent
Liu

(10) Patent No.: US 8,924,959 B2
(45) Date of Patent: Dec. 30, 2014

(54) SWITCHING HARDWARE DEVICES IN VIRTUAL MACHINE SYSTEMS USING RESOURCE CONVERTING RELATIONSHIPS

(76) Inventor: Chunmei Liu, Beijing (CN)

( * ) Notice: Subject to any disclaimer, the term of this patent is extended or adjusted under 35 U.S.C. 154(b) by 1899 days.

(21) Appl. No.: 11/760,875

(22) Filed: Jun. 11, 2007

(65) Prior Publication Data

US 2007/0300223 A1    Dec. 27, 2007

(30) Foreign Application Priority Data

Jun. 23, 2006 (CN) .......................... 2006 1 0093162

(51) Int. Cl.
*G06F 9/455* (2006.01)
*G06F 9/50* (2006.01)

(52) U.S. Cl.
CPC .... *G06F 9/5077* (2013.01); *G06F 2009/45579* (2013.01); *G06F 9/45558* (2013.01)
USPC .......................................................... 718/1

(58) Field of Classification Search
None
See application file for complete search history.

(56) References Cited

U.S. PATENT DOCUMENTS

| 6,289,396 B1* | 9/2001 | Keller et al. .................. 719/323 |
| 7,272,799 B2* | 9/2007 | Imada et al. .................. 715/767 |
| 7,797,699 B2* | 9/2010 | Kagi et al. ........................ 718/1 |
| 7,971,203 B2* | 6/2011 | Lantz et al. ...................... 718/1 |
| 2005/0132365 A1* | 6/2005 | Madukkarumukumana et al. ................................. 718/1 |
| 2005/0198632 A1* | 9/2005 | Lantz et al. ....................... 718/1 |

* cited by examiner

*Primary Examiner* — Meng An
*Assistant Examiner* — Eric C Wai

(57) ABSTRACT

The present invention provides a virtual machine system and a method for switching hardware devices thereof. In the virtual machine system, the hardware devices are classified into all-time sharing devices, time division switching devices and all-time exclusive devices based on using fashions. For the time division switching devices, the method for switching hardware devices is adopted, comprising steps of: upon system switching, sending a corresponding switching signal to a device model (DM) module corresponding to a foreground Guest OS and a DM module corresponding to a background Guest OS; the DM module corresponding to the foreground Guest OS releasing the hardware devices from its device space; the DM module corresponding to the background Guest OS adding the hardware devices released by the DM module corresponding to the foreground Guest OS to its device space. It is possible to implement switching of hardware devices among different Guest OSs by the system and method of the invention.

18 Claims, 6 Drawing Sheets

SWITCHING HARDWARE DEVICES IN VIRTUAL MACHINE SYSTEMS USING RESOURCE CONVERTING RELATIONSHIPS

BACKGROUND OF THE INVENTION

1. Field of the Invention

The present invention relates to a virtual machine technology, and more specifically, to a virtual machine system and a method for switching hardware devices thereof.

2. Description of Prior Art

In the process of existing virtualizations, there is a general virtual device platform, including virtual sound cards, virtual graphic cards and the like. Accesses to virtual devices in the virtual device platform by a Guest OS are directed to real devices through a Service OS or a Host OS by a Virtual Machine Monitor (VMM).

FIG. 1 is a schematic view of an existing Xen® virtual machine system. Xen® is Open Source software, released under the terms of the GNU General Public License, developed by the University of Cambridge. As shown in FIG. 1, the Xen® virtual machine system comprises a Guest OS, a Service OS, a Virtual Machine Monitor and hardware. The Guest OS is provided with applications and a driver module, and the Service OS is provided with a Device Model (DM) module and a driver module.

Hereinafter, the process of accessing the hardware by the Guest OS in the above Xen® virtual machine system is described with reference to FIG. 2.

Before the Guest OS initiates the access to the hardware, first, the Service OS, upon starting, scans a PCI bus, to allocate resources for the hardware, including IRQ, I/O, MMIO and the like. A virtual hardware platform is generated for the Guest OS by the DM module when the Guest OS is created.

The Guest OS, upon starting, scans a virtual PCI bus, to allocate resources for virtual hardware. After the Guest OS allocates the resources for the virtual hardware, device can be accessed.

The process of accessing the device by the Guest OS is described in the following.

When the Guest OS needs to access a hardware I/O space, it generates a corresponding I/O request by the virtual hardware drive module.

The VMM intercepts the I/O request generated by the drive module of the Guest OS, and sent it to the DM module in the Service OS.

The DM module analyzes the I/O request, and converts it into a corresponding invoking instruction. The invoking instruction is converted to I/O instructions by the drive module of the Service OS so as to invoke corresponding hardware.

After receiving a response from the hardware, the Service OS sends this response to the Guest OS through the VMM, so as to finish the access to the hardware by the Guest OS.

The process of accessing the hardware by the Guest OS is explained above in the Xen® virtual machine system as an example. For other virtual machine systems, such as Vmware virtual machine system, the similar access process is performed, except that a Host OS plays the role of the Service OS in the Xen® virtual machine system.

Because it is impossible for the existing virtual machine systems to solve the problem of sharing the real hardware devices by a plurality of operating systems, in the above general virtualization platform, the virtualized devices are consistent regardless of the real device platforms. Although this applies to various Guest OSs, the following problems will arise:

1) The hardware devices displayed by the virtual machine system are not consistent with the real hardware devices, and users cannot see the real hardware devices.
2) Further, some properties of the real hardware cannot be used, such as hardware accelerating property of graphical cards, new standard of USB, and advanced properties of sound cards.
3) Because it is only possible for the Guest OS to access the hardware by the VMM and the Service OS, there additionally exist corresponding intermediate processes, impacting the performance of accessing the hardware.
4) Because there is provided no corresponding management and control for hardware properties, the properties of the real hardware are not completely exploited.

SUMMARY OF THE INVENTION

It is an object of the present invention to provide a virtual machine system.

It is another object of the present invention to provide a method for switching hardware devices in the virtual machine system.

According to an aspect of the invention, a virtual machine system of the present invention comprises a Service OS, Guest OSs, a virtual machine monitor (VMM) and hardware devices, wherein the Service OS comprises respective device model (DM) modules corresponding to the respective Guest OSs, wherein the VMM further comprises a resource converting module, a switching judging module and an access control module.

Wherein, said resource converting module is provided for storing converting relationships between resources allocated by the Service OS for the hardware devices, and resources allocated by the Guest OSs for the hardware devices provided by the Services OS to be directly accessed by the Guest OSs, and for converting an accessing address for the Guest OSs to a real physical address of a corresponding hardware device based on the converting relationships when the Guest OSs generate a request of accessing the hardware device to be directly accessed. Said switching judging module is provided for judging whether pressed keys are switching combined keys, and in the case of a positive result, informing said access control module, wherein the access control module sequentially informs the DM module of a foreground Guest OS to release the hardware devices to be switched from its device space, which DM module of the foreground Guest OS in turn informs the access control module to remove the corresponding resource converting relationships from the resource converting module; and the DM module of a background Guest OS to add the hardware devices to be switched to its device space, which DM module of the background Guest OS in turn informs the access control module to add the corresponding resource converting relationships to the resource converting module.

According to another aspect of the invention, a virtual machine system of the present invention comprises a Service OS, Guest OSs, a virtual machine monitor (VMM) and hardware devices, wherein the Service OS comprises respective device model (DM) modules corresponding to the respective Guest OSs, wherein the VMM further comprises a resource converting module and an access control module, the Service OS further comprises a switching service module.

Wherein, said resource converting module is provided for storing converting relationships between resources allocated by the Service OS for the hardware devices, and resources allocated by the Guest OSs for the hardware devices provided by the Services OS to be directly accessed by the Guest OSs, and for converting an accessing address for the Guest OSs to a real physical address of a corresponding hardware device based on the converting relationships when the Guest OSs generate a request of accessing the hardware device to be directly accessed. Said switching service module, providing a user interface for switching devices, is provided for sequentially informing, upon switching devices, the DM module of a foreground Guest OS to release the hardware devices from its device space, which DM module of the foreground Guest OS in turn informs the access control module to remove the corresponding resource converting relationships from the resource converting module; and the DM module of a background Guest OS to add the hardware devices to its device space, which DM module of the background Guest OS in turn informs the access control module to add the corresponding resource converting relationships to the resource converting module.

A method for switching hardware devices of a virtual machine system according to the present invention comprises steps of:

upon system or device switching, sequentially sending a corresponding switching signal to a device model (DM) module corresponding to a foreground Guest OS and a DM module corresponding to a background Guest OS;

the DM module corresponding to the foreground Guest OS releasing the hardware devices from its device space;

the DM module corresponding to the background Guest OS, adding the hardware devices released by the DM module corresponding to the foreground Guest OS, into its device space.

The above hardware devices comprise time division switching devices, comprising keyboards, and/or mouse, and/or graphical cards in a full screen display mode, and/or sound cards, and/or USB devices.

The present invention has the following advantages over the prior art.

1) Based on the custom or prescription of using hardware devices, the different sharing modes for devices among the virtual machine systems are set. Based on the different sharing modes, the different methods for accessing the hardware devices by the virtual machine systems are provided. The sharing modes can be classified into: all-time sharing mode, time division switching mode, all-time exclusive mode and the like. This enhances the performance of accessing the hardware devices by the virtual systems to the largest extent.

2) The hardware devices displayed by the virtual machine system are related to the sharing modes of the devices. For exclusive devices, the real hardware devices may be displayed. For time division switching devices, a real hardware device may be seen when the virtual system possesses this device; otherwise, when this device is switched off from this virtual system, this virtual system does not possess this device and may not display this device, implementing the switching of the device among the different Guest OSs. For all-time sharing devices, the virtual system sees the simulated device types, which is consistent with the prior art.

3) Because for time division switching devices or all-time exclusive devices, the Guest OS may, directly or through the VMM, access the real hardware devices, the efficiency of accessing the virtual machine system hardware is improved.

DETAILED DESCRIPTION OF PREFERRED EMBODIMENTS

Hereinafter, a virtual machine system and a method for switching hardware devices thereof are described with reference to drawings.

In applications of the present invention, the usages of hardware are classified as following based on the custom or man-made prescription of using hardware.

1) Time division switching devices, such as keyboards, mouse, graphic cards (in a full screen display mode), sound cards and USB devices. Only one Guest OS may possess an exclusive usage right of these devices at one time. However, when Guest OSs are switched, the usage rights of standard input output devices (such as keyboards, mouse, graphic cards in the full screen display mode) shall automatically be switched to a foreground system, while for sound cards and USB devices, the usage rights thereof shall be possessed by which Guest OS may be determined by users by means of manual switching.

2) All-time sharing devices, such as hard drives and network devices. When these devices are run in the virtual machine system, generally they can be simultaneously accessed by two or more Guest OSs. If the switching scheme is adopted for them, the running of the virtual machine system will be severely affected.

3) All-time exclusive devices, such as PCI devices. They can be assigned to one Guest OS by users to run. Any other Guest OS has no right to access such devices at any time unless the virtual machine system is reconfigured. In actual applications, sound cards, USB devices and the like can be set as all-time exclusive devices as desired, so as to be accessed by the assigned Guest OS.

To completely exploit properties of the real hardware, the present invention provides a virtual machine system and a time division switching method for time division switching devices for the above hardware usage modes and hardware properties.

Figure 1:
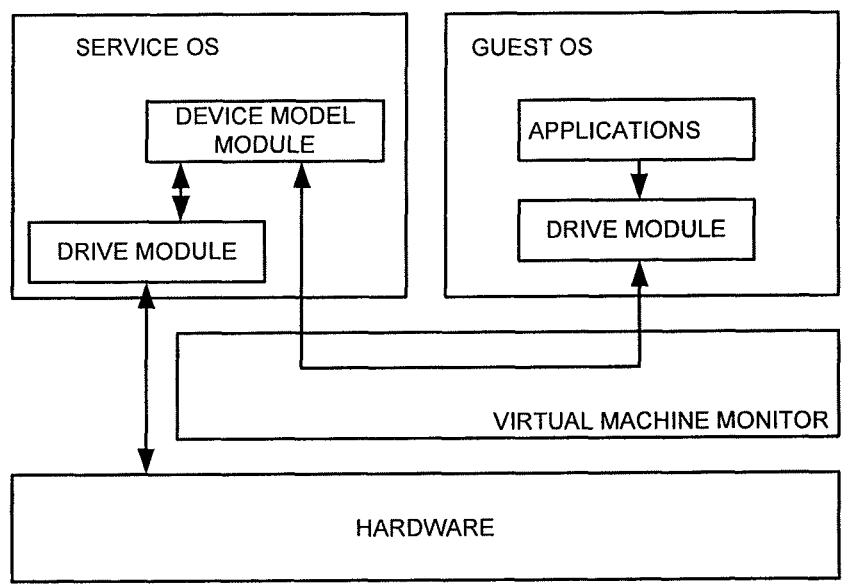
FIG. 1 is a schematic diagram showing an existing Xen virtual machine system.
Figure 2:
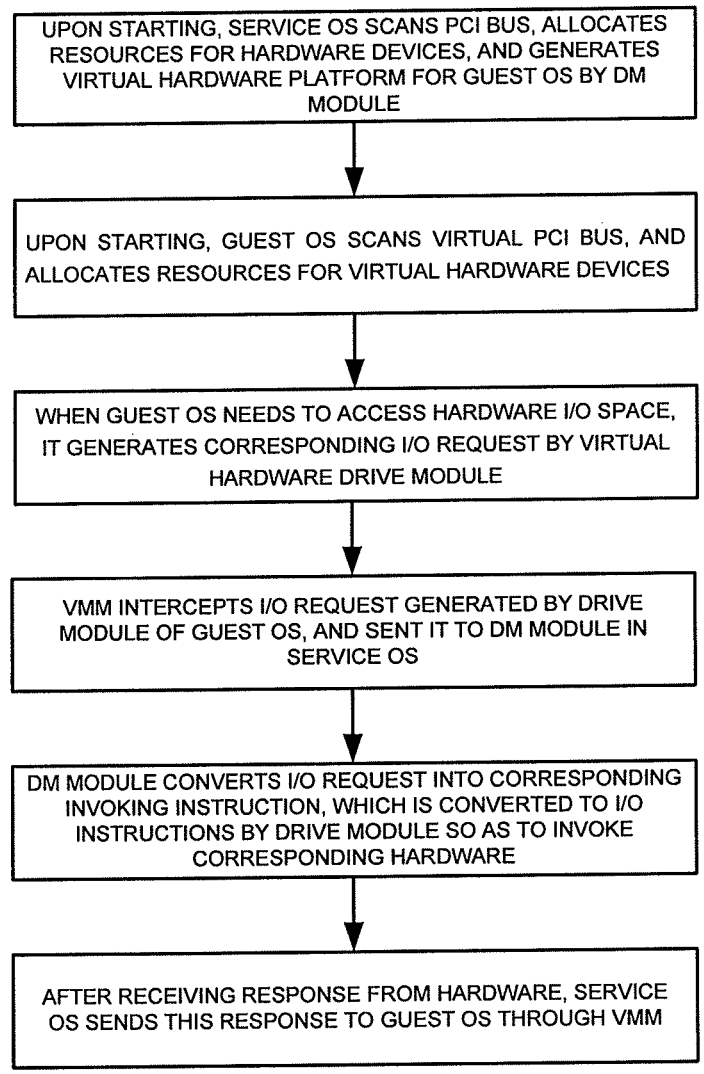
FIG. 2 is a flowchart illustrating the process of accessing hardware devices by a Guest OS in the virtual machine system shown in FIG. 1.
Figure 3:
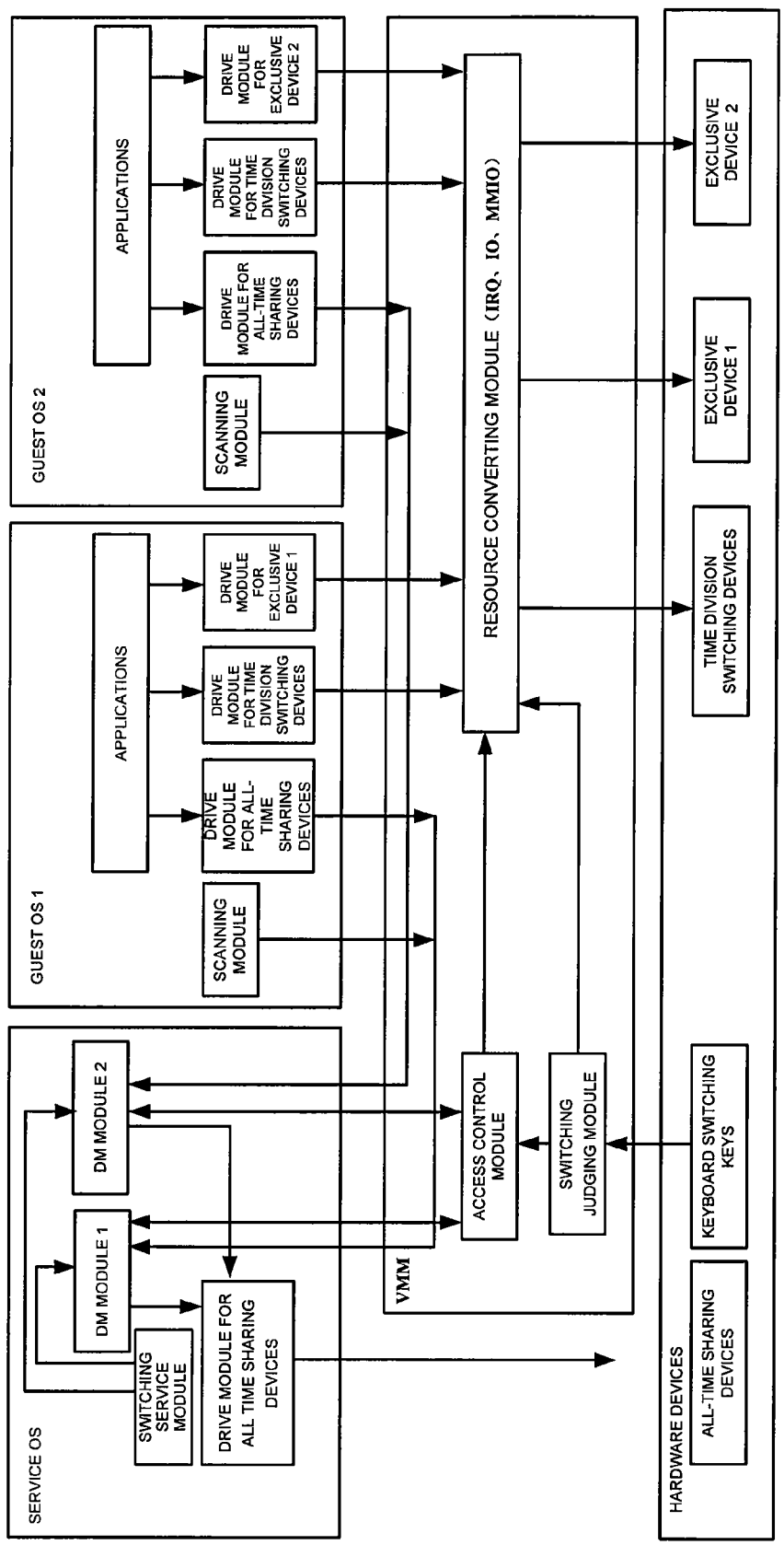
FIG. 3 is a schematic structure diagram of a virtual machine system according to the present invention.

FIG. 3 is a schematic structure diagram of the virtual machine system according to the present invention. As shown in FIG. 3, the virtual machine system according to the present invention comprises a Service OS, Guest OSs, and a Virtual Machine Monitor (VMM) and hardware devices. Among them, the Service OS includes device model (DM) modules and drive modules. The DM modules corresponds to respective Guest OSs, that is, it is the DM module 1 that corresponds to the Guest OS 1, and it is the DM module 2 that corresponds to the Guest OS 2.

The Guest OS includes a scanning module and drive modules. In the present invention, there may be a number of Guest OSs, and there are only schematically shown two in FIG. 3. The drive modules of the Guest OS 1 comprise a drive module for all-time sharing devices, a drive module for time division switching devices and a drive module for all-time exclusive device 1. The drive modules of the Guest OS 2 comprise a drive module for all-time sharing devices, a drive module for time division switching devices and a drive module for all-time exclusive device 2.

To implement direct access to hardware devices by the Guest OSs, the VMM comprises a resource converting module for performing operations such as IRQ converting, I/O converting or MMIO mapping. In the present invention, the VMM further comprises a switching judging module and an access control module for carry out switching of the time division switching devices, including automatically switching standard input output devices (such as keyboards, mouse, and graphical cards in the full screen display mode) to the Guest OS in the foreground, and switching the devices such as sound cards and USB devices by means of manual switching.

In the present invention, to solve the problem of the system memory and hardware operating in a manner of Direct Memory Access (DMA), the address of the VMM running in the low-end memory is moved from the low-end memory to the high-end memory, that is, the physical memory address of the Guest OS is made consistent with the memory address of the machine.

Figure 4:
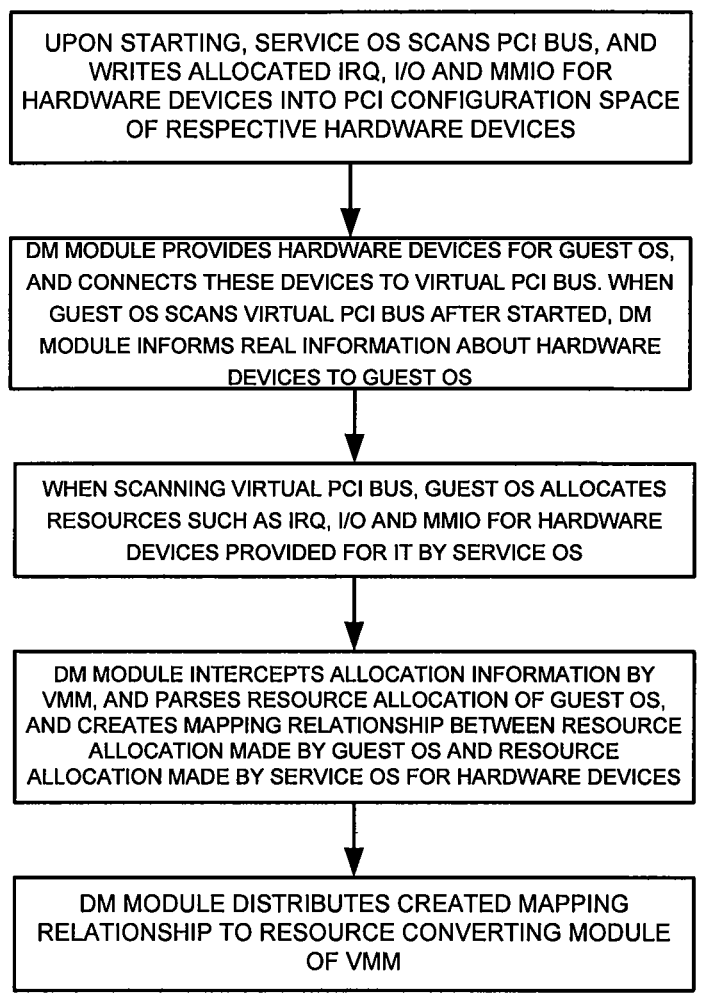
FIG. 4 is a flowchart illustrating the process of allocating resources in the virtual machine system according to the present invention.

Before the Guest OS accesses the hardware, it is necessary for the Service OS and the Guest OS to allocate the resources such as IRQ, I/O and MMIO for the hardware devices. FIG. 4 is a flowchart illustrating the process of allocating the resources in the virtual machine system according to the present invention.

As shown in FIG. 4, upon starting, the Service OS scans a PCI bus, allocates the resources such as IRQ, I/O and MMIO for the hardware devices, and writes the allocated IRQ, I/O and MMIO into a PCI configuration space of respective hardware devices. The above described hardware devices are all-time sharing devices, time division switching devices and all-time exclusive devices mentioned in the present invention. When allocating the resources, the Service OS allocates respective resources for respective devices, and writes the allocated resources into the respective PCI configuration space of the respective devices.

For all-time exclusive devices and time division exclusive devices, the DM module provides hardware devices for the Guest OS according to settings of a configuration file. The DM module obtains the real information about the hardware devices from the Service OS, and connects these devices to the virtual PCI bus. When the Guest OS scans the virtual PCI bus after started, the DM module informs the real information about the hardware devices to the Guest OS, and makes the Guest OS see the real hardware devices. For all-time sharing devices, the DM module provides virtual devices regardless of real hardware devices.

When scanning the virtual PCI bus, the Guest OS allocates the resources such as IRQ, I/O and MMIO for the hardware devices provided for it by the Service OS.

Because each Guest OS needs to directly access the time division switching devices and all-time exclusive devices, and each Guest OS allocates the resources such as IRQ, I/O and MMIO for the time division switching devices and/or exclusive devices among the hardware devices provided by the Service OS, while the Service OS allocates the resources such as IRQ, I/O and MMIO for all hardware devices, thus, there may be a conflict when the Guest OS and the Service OS allocate resources for the same hardware device.

In the present invention, for all-time sharing devices, the resources allocating and accessing are performed in the prior way. Therefore, there is no conflict in allocating resources.

However, for time division switching devices and/or all-time exclusive devices, there may be a conflict between the Guest OS and the Service OS in allocating resources.

In the case of conflicting, in order to avoid the conflicting, in the present application, when the Guest OS scans the virtual PCI bus so as to allocate IRQ, I/O and MMIO resources for the hardware devices (time division switching devices and/or exclusive devices), the DM module intercepts the allocation information by the VMM, and parses the resource allocation of the Guest OS, and creates an mapping relationship between the resource allocation made by the Guest OS and the resource allocation made by the Service OS for hardware devices. That is to say, a correspondence relationship is created between the resource allocation made by the Guest OS and the resource allocation made by the Service OS for hardware devices.

Then, the DM module distributes the created mapping relationship to the resource converting module of the VMM, that is, the DM module distributes the converting relationships of I/O and IRQ allocated by the Guest OS and/or the mapping relationship of MMIO to the resource converting module of the VMM.

Figure 5:
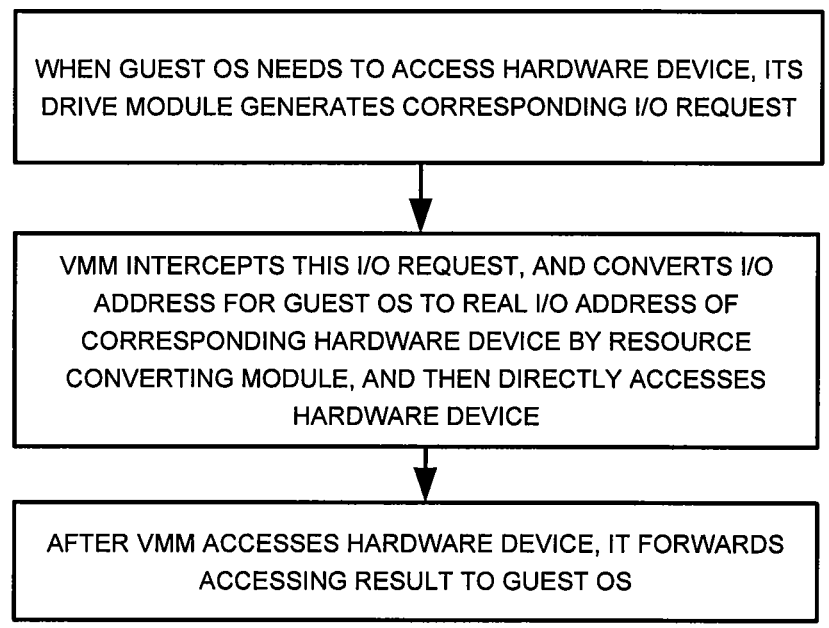
FIG. 5 is a flowchart illustrating a method for accessing hardware devices in the virtual machine system according to the present invention.

Hereinafter, a method for accessing the hardware devices in the virtual machine system according to the present invention is explained with reference to FIG. 5. To completely exploit the usage properties of various hardware devices, in the present invention, the all-time sharing devices are accessed in a manner of hardware accessing in the existing virtual machine systems. Therefore, only the accesses to the time division switching devices and all-time exclusive devices by the Guest OS are explained in the following.

When the Guest OS needs to access an all-time exclusive device or a time division switching device, its drive module for exclusive devices or drive module for time division switching devices generates a corresponding I/O request.

The VMM intercepts this I/O request, and converts the I/O address (accessing address) for the Guest OS to a real I/O address (real physical address) of the corresponding exclusive device or the time division switching device by the resource converting module. Then, the all-time exclusive device or the time division switching device is directly accessed.

After the VMM accesses the all-time exclusive device or the time division switching device, it forwards the accessing result to the Guest OS.

Further, when the Guest OS accesses the exclusive device or the time division switching device, the MMIO allocated by the Guest OS may be mapped to a physical MMIO (a MMIO address allocated by the Service OS) by the resource converting module. When there is a Page Fault, the VMM writes the real address corresponding to the MMIO into Shadow Page Tables. Thus, the Guest OS may directly access the MMIO address of the all-time exclusive device or the time division switching device by the Shadow Page Tables created by the VMM.

When the all-time exclusive device or the time division switching device generates an interrupt, the VMM converts the interrupt generated by the all-time exclusive device or the time division switching device to an interrupt signal for the Guest OS based on the converting relationships by the resource converting module, and then send it to the Guest OS.

Thus, by means of the DM module and the VMM, the Guest OS may directly access the real exclusive devices or time division switching devices.

Although the accesses to the exclusive devices and to the time division switching devices are identical according to the above, because the exclusive devices are pre-allocated in configuring the system, the accesses to the exclusive devices allocated to the Guest OS will not vary whether the Guest OS is in the foreground or not. However, for the time division switching devices, because they are not exclusively used by a certain Guest OS all the time, the Guest OS must perform switching so as to acquire the usage rights of the time division switching devices. Only when the usage right of a time division switching device belongs to a certain Guest OS at a time instant, the Guest OS may access the time division switching device at this instant.

Figure 6:
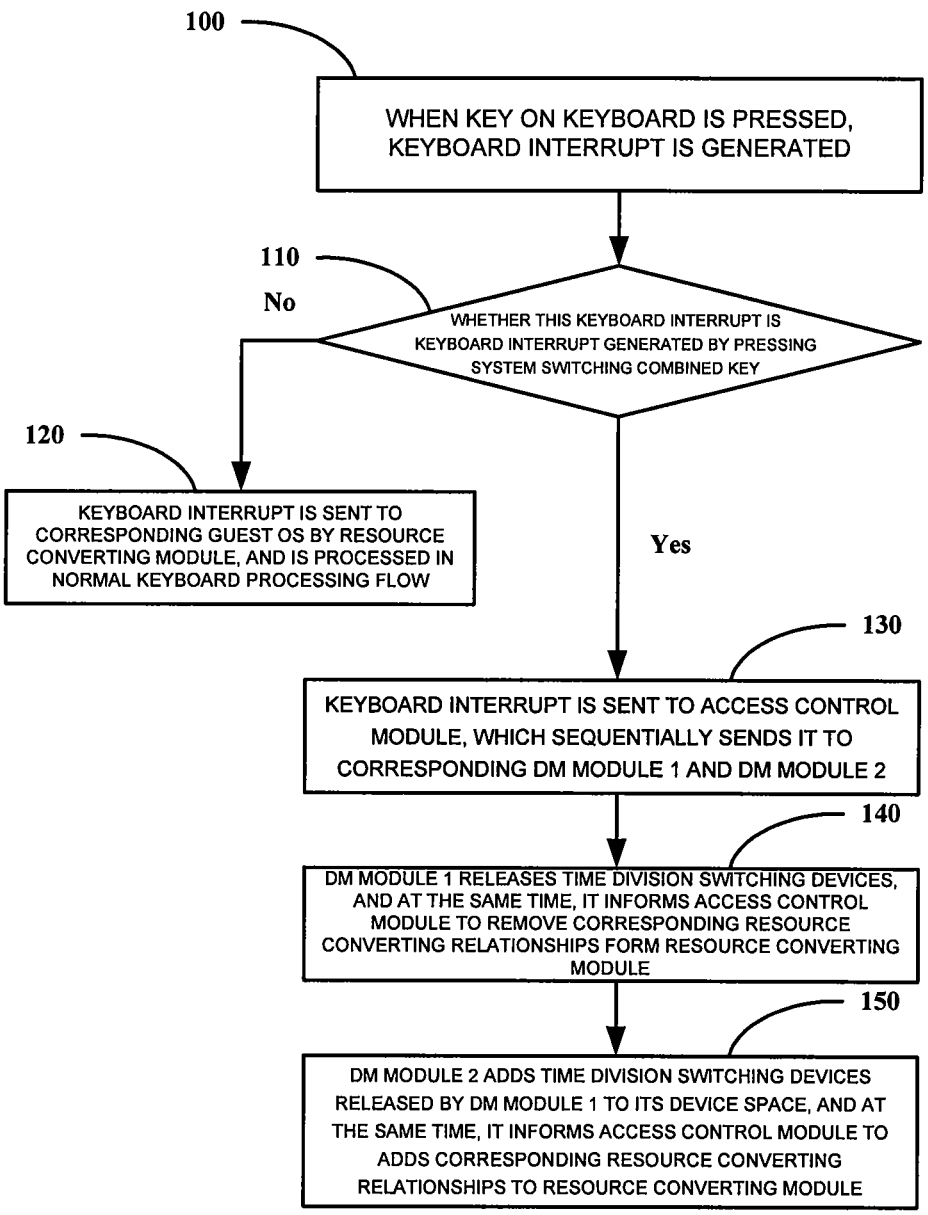
FIG. 6 is a flowchart illustrating a method for switching the hardware devices in the virtual machine system according to the present invention.

Therefore, for time division switching devices, it is necessary to consider the switching among different Guest OSs. To implement the switching of the time division switching devices among different Guest OSs, as shown in FIG. 3, in the virtual machine system according to the present invention, the switching flow may be triggered by switching combined keys (including a system switching combined key and a device switching combined key) preset on the keyboard, and also may be triggered by setting a corresponding user interface (a switching service module) in the Service OS. The specific switching flow is shown in FIG. 6.

When a key on the keyboard is pressed, a keyboard interrupt is generated (step 100). The switching judging module, upon receiving the keyboard interrupt, judges whether this keyboard interrupt is a keyboard interrupt generated by pressing the system/device switching combined key (step 110). If not, the keyboard interrupt is sent to the corresponding Guest OS by the resource converting module, and is processed in a normal keyboard processing flow (step 120).

When the keyboard interrupt is a keyboard interrupt generated by pressing the system/device switching combined key, the switching judging module sends switching information to the access control module. The access control module sequentially sends the switching information to the DM module 1 corresponding to the foreground Guest OS (assumed to be the Guest OS 1) and the DM module 2 corresponding to the background Guest OS (assumed to be the Guest OS 2) (step 130). At this time, the DM module 1 releases the time division switching devices such as the keyboard, the mouse and the graphical card, that is, removes these devices from its device space, and at the same time, it informs the access control module to remove the corresponding resource converting relationships form the resource converting module (step 140).

Next, the DM module 2 of the Guest OS 2 adds the time division switching devices released by the DM module 1, such as the keyboard, the mouse, and the graphic card, to its device space, and at the same time, it informs the access control module to adds the corresponding resource converting relationships to the resource converting module (step 150). Thus, it is possible to carry out the switching of the time division devices at the time of switching the systems. The switching of the time division devices is explained in the above for the keyboard, the mouse and the graphical card by way of example, and additionally, this also applies to the time division devices such as sound cards and USB devices.

Further, for the time division switching devices such as sound cards and USB devices, in addition to the above keyboard switching, the switching may be performed by the switching service module (the user interface) provided by the Service OS.

When the user wants to switch the time division switching devices such as sound cards and USB devices from one Guest OS to another Guest OS, assuming from the Guest OS 1 to the Guest OS 2, he/she accesses the switching service module of the Service OS. The switching service module informs the DM module 1 corresponding to the Guest OS 1 to remove the time division switching devices from the PCI bus space, and in turn the DM module 1 informs the access control module to remove the corresponding resource converting relationships from the resource converting module. Next, the switching service module informs the DM module 2 to add these devices to the PCI bus space, and in turn the DM module 2 informs the access control module to add the corresponding resource converting relationships to the resource converting module.

Thus, when the time division switching devices are switched to the Guest OS 2, there will appear no switched device in the device space of the Guest OS 1. Therefore, the Guest OS 1 may not access these time division switching devices any more. However, for the Guest OS 2 to which the time division switching devices are switched, these time division switching devices will be found again in its device space, therefore, these devices can be accessed as exclusive devices.

According to the above description, the present invention has the following advantages over the existing virtual machine systems and the hardware accessing methods.

1) Based on the custom or prescription of using hardware devices, the different sharing modes for devices among the virtual machine systems are set. Based on the different sharing modes, the different methods for accessing the hardware devices by the virtual machine systems are provided. The sharing modes can be classified into: all-time sharing mode, time division switching mode, all-time exclusive mode and the like. This enhances the performance of accessing the hardware devices by the virtual systems to the largest extent.

2) The hardware devices displayed by the virtual machine system are related to the sharing modes of the devices. For exclusive devices, the real hardware devices may be displayed. For time division switching devices, a real hardware device may be seen when the virtual system possesses this device; otherwise, when this device is switched off from this virtual system, this virtual system does not possess this device and may not display this device, implementing the switching of the device among the different Guest OSs. For all-time sharing devices, the virtual system sees the simulated device types, which is consistent with the prior art.

3) Because for time division switching devices or all-time exclusive devices, the Guest OS may, directly or through the VMM, access the real hardware devices, the efficiency of accessing the virtual machine system hardware is improved.

Those described above are only better specific embodiments of the present invention, and the scope of the present invention is not limited thereto. Within the technical scope disclosed by the present invention, changes or replacements obvious for those skilled in the art are intended to fall into the scope of the present invention. Therefore, the scope of the present invention is defined in the claims.

What is claimed is:

1. A virtual machine system, comprises a Service OS, Guest OSs, a virtual machine monitor (VMM) and hardware devices, wherein the Service OS and the Guest OSs run over the VMM, the hardware devices includes a first type of hardware devices that can be directly accessed by the Guest OSs and a second type of hardware devices that cannot be directly accessed by the Guest OSs, wherein the first type of hardware devices include all-time exclusive devices and/or time division switching devices, and the second type of hardware devices include all-time sharing devices, wherein the Service OS is able to generate request of accessing a hardware device, and comprises respective device model (DM) modules corresponding to the respective Guest OSs, wherein the Guest OSs comprise three types of drive modules comprising a drive module for all-time sharing devices, a drive module for time division switching devices and a drive module for all-time exclusive devices, wherein the VMM comprises a resource converting module, a switching judging module and an access control module, wherein, said resource converting module is provided for storing converting relationships between resources allocated by the Service OS and by the Guest OSs for the first type of hardware devices, and further provided for converting an accessing address for the Guest OSs to a real physical address of a corresponding hardware device based on the converting relationships when the Guest OSs generate a request of accessing the hardware device to be directly accessed, said switching judging module is provided for judging whether pressed keys are switching combined keys, and in case of a positive result, informing said access control module, wherein the access control module sequentially informs, the DM module of a foreground Guest OS to release the hardware devices to be switched from its device space, which DM module of the foreground Guest OS in turn informs the access control module to remove resource converting relationships corresponding to the foreground Guest OS for the hardware devices switched from the resource converting module; and the DM module of a background Guest OS to add the hardware devices to be switched to its device space, which DM module of the background Guest OS in turn informs the access control module to add resource converting relationships corresponding to the background Guest OS for the hardware devices switched to the resource converting module.

2. The system according to claim 1, wherein the switching combined keys are classified into system switching combined keys and/or device switching combined keys.

3. The system according to claim 2, wherein the Service OS further comprises a switching service module, providing a user interface for switching devices, for sequentially informing, upon switching devices, the DM module of the foreground Guest OS to release the hardware devices from its device space, which DM module of the foreground Guest OS in turn informs the access control module to remove the corresponding resource converting relationships from the resource converting module; and the DM module of the background Guest OS to add the hardware devices to its device space, which DM module of the background Guest OS in turn informs the access control module to add the corresponding resource converting relationships to the resource converting module.

4. The system according to claim 1, wherein the time division switching devices comprise keyboards, and/or mouse, and/or graphical cards in a full screen display mode, and/or sound cards, and/or USB devices.

5. The system according to claim 4, wherein the Service OS further comprises a switching service module, providing a user interface for switching devices, for sequentially informing, upon switching devices, the DM module of the foreground Guest OS to release the hardware devices from its device space, which DM module of the foreground Guest OS in turn informs the access control module to remove the corresponding resource converting relationships from the resource converting module; and the DM module of the background Guest OS to add the hardware devices to its device space, which DM module of the background Guest OS in turn informs the access control module to add the corresponding resource converting relationships to the resource converting module.

6. The system according to claim 1, wherein the all-time exclusive devices comprise sound cards, and/or USB devices, and/or other PCI devices.

7. The system according to claim 6, wherein the Service OS further comprises a switching service module, providing a user interface for switching devices, for sequentially informing, upon switching devices, the DM module of the foreground Guest OS to release the hardware devices from its device space, which DM module of the foreground Guest OS in turn informs the access control module to remove the corresponding resource converting relationships from the resource converting module; and the DM module of the background Guest OS to add the hardware devices to its device space, which DM module of the background Guest OS in turn informs the access control module to add the corresponding resource converting relationships to the resource converting module.

8. The system according to claim 1, wherein the all-time sharing devices comprise hard drives and/or network devices.

9. The system according to claim 8, wherein the Service OS further comprises a switching service module, providing a user interface for switching devices, for sequentially informing, upon switching devices, the DM module of the foreground Guest OS to release the hardware devices from its device space, which DM module of the foreground Guest OS in turn informs the access control module to remove the corresponding resource converting relationships from the resource converting module; and the DM module of the background Guest OS to add the hardware devices to its device space, which DM module of the background Guest OS in turn informs the access control module to add the corresponding resource converting relationships to the resource converting module.

10. The system according to claim 1, wherein the Service OS further comprises a switching service module, providing a user interface for switching devices, for sequentially informing, upon switching devices, the DM module of the foreground Guest OS to release the hardware devices from its device space, which DM module of the foreground Guest OS in turn informs the access control module to remove the corresponding resource converting relationships from the resource converting module; and the DM module of the background Guest OS to add the hardware devices to its device space, which DM module of the background Guest OS in turn informs the access control module to add the corresponding resource converting relationships to the resource converting module.

11. The system according to claim 1, wherein the Service OS further comprises a switching service module, providing a user interface for switching devices, for sequentially informing, upon switching devices, the DM module of the foreground Guest OS to release the hardware devices from its device space, which DM module of the foreground Guest OS in turn informs the access control module to remove the corresponding resource converting relationships from the resource converting module; and the DM module of the background Guest OS to add the hardware devices to its device space, which DM module of the background Guest OS in turn informs the access control module to add the corresponding resource converting relationships to the resource converting module.

12. A virtual machine system, comprises a Service OS, Guest OSs, a virtual machine monitor (VMM) and hardware devices, wherein the Service OS and the Guest OSs run over the VMM, the hardware devices include a first type of hardware devices that can be directly accessed by the Guest OSs and a second type of hardware devices that cannot be directly accessed by the Guest OSs, wherein the first type of hardware devices include all-time exclusive devices and/or time division switching devices, and the second type of hardware devices include all-time sharing devices, wherein the Service OS is able to generate request of accessing a hardware device and comprises respective device model (DM) modules corresponding to the respective Guest OSs, wherein the Guest OSs comprise three types of drive modules comprising a drive module for all-time sharing devices, a drive module for time division switching devices and a drive module for all-time exclusive devices, wherein the VMM further comprises a resource converting module and an access control module, the Service OS further comprises a switching service module, wherein,
   said resource converting module is provided for storing converting relationships between resources allocated by the Service OS and by the Guest OSs for the first type of hardware devices, and for converting an accessing address for the Guest OSs to a real physical address of a corresponding hardware device based on the converting relationships when the Guest OSs generate a request of accessing the hardware device to be directly accessed,
   said switching service module, providing a user interface for switching devices, is provided for sequentially informing, upon switching devices,
   the DM module of a foreground Guest OS to release the hardware devices from its device space, which DM module of the foreground Guest OS in turn informs the access control module to remove resource converting relationships corresponding to the foreground Guest OS for the hardware devices switched from the resource converting module; and
   the DM module of a background Guest OS to add the hardware devices to its device space, which DM module of the background Guest OS in turn informs the access control module to add resource converting relationships corresponding to the background Guest OS for the hardware devices switched to the resource converting module.

13. The system according to claim 12, wherein the switching combined keys are classified into system switching combined keys and/or device switching combined keys.

14. The system according to claim 12, wherein the time division switching devices comprise keyboards, and/or mouse, and/or graphical cards in a full screen display mode, and/or sound cards, and/or USB devices.

15. The system according to claim 12, wherein the all-time exclusive devices comprise sound cards, and/or USB devices, and/or other PCI devices.

16. The system according to claim 12, wherein the all-time sharing devices comprise hard drives and/or network devices.

17. A method for switching hardware devices of a virtual machine system, wherein the virtual machine system comprises a Service OS, Guest OSs, a virtual machine monitor (VMM) and hardware devices, wherein the Service OS and the Guest OSs run over the VMM, wherein the hardware devices include a first type of hardware devices that can be directly accessed by the Guest OSs and a second type of hardware devices that cannot be directly accessed by the Guest OSs, and the first type of hardware devices include all-time exclusive devices and/or time division switching devices, and the second type of hardware devices include all-time sharing devices, wherein the Service OS is able to generate request of accessing a hardware device, and comprises respective device model (DM) modules corresponding to the respective Guest OSs, wherein the Guest OSs comprise three types of drive modules comprising a drive module for all-time sharing devices, a drive module for time division switching devices and a drive module for all-time exclusive devices, wherein the VMM further comprises a resource converting module and an access control module, the Service OS further comprises a switching service module, said resource converting module provided for storing converting relationships between resources allocated by the Service OS and by the Guest OSs for the first type of hardware devices, and for converting an accessing address for the Guest OSs to a real physical address of a corresponding hardware device based on the converting relationships when the Guest OSs generate a request of accessing the hardware device to be directly accessed, wherein the method comprises steps of:
   upon system or device switching, said switching service module sequentially sending a corresponding switching signal to a device model (DM) module corresponding to a foreground Guest OS and a DM module corresponding to a background Guest OS;
   the DM module corresponding to the foreground Guest OS releasing the hardware devices from its device space, which DM module of the foreground Guest OS in turn informs the access control module to remove resource converting relationships corresponding to the foreground Guest OS for the hardware devices switched from the resource converting module;
   the DM module corresponding to the background Guest OS, adding the hardware devices released by the DM module corresponding to the foreground Guest OS, into its device space, which DM module of the background Guest OS in turn informs the access control module to add resource converting relationships corresponding to the background Guest OS for the hardware devices switched to the resource converting module.

18. The method according to claim 17, wherein the time division switching devices comprise keyboards, and/or mouse, and/or graphical cards in a full screen display mode, and/or sound cards, and/or USB devices, and/or other PCI devices.

* * * * *

UNITED STATES PATENT AND TRADEMARK OFFICE
CERTIFICATE OF CORRECTION

PATENT NO. : 8,924,959 B2  Page 1 of 1
APPLICATION NO. : 11/760875
DATED : December 30, 2014
INVENTOR(S) : Chunmei Liu It is certified that error appears in the above-identified patent and that said Letters Patent is hereby corrected as shown below:

Title Page

Delete "(76)", and replace with --(75)--

Insert Item --(73) Assignee: Lenovo (Beijing) Limited, Beijing, CHINA--

Signed and Sealed this
Second Day of February, 2016

Michelle K. Lee
*Director of the United States Patent and Trademark Office*